Figure 1:
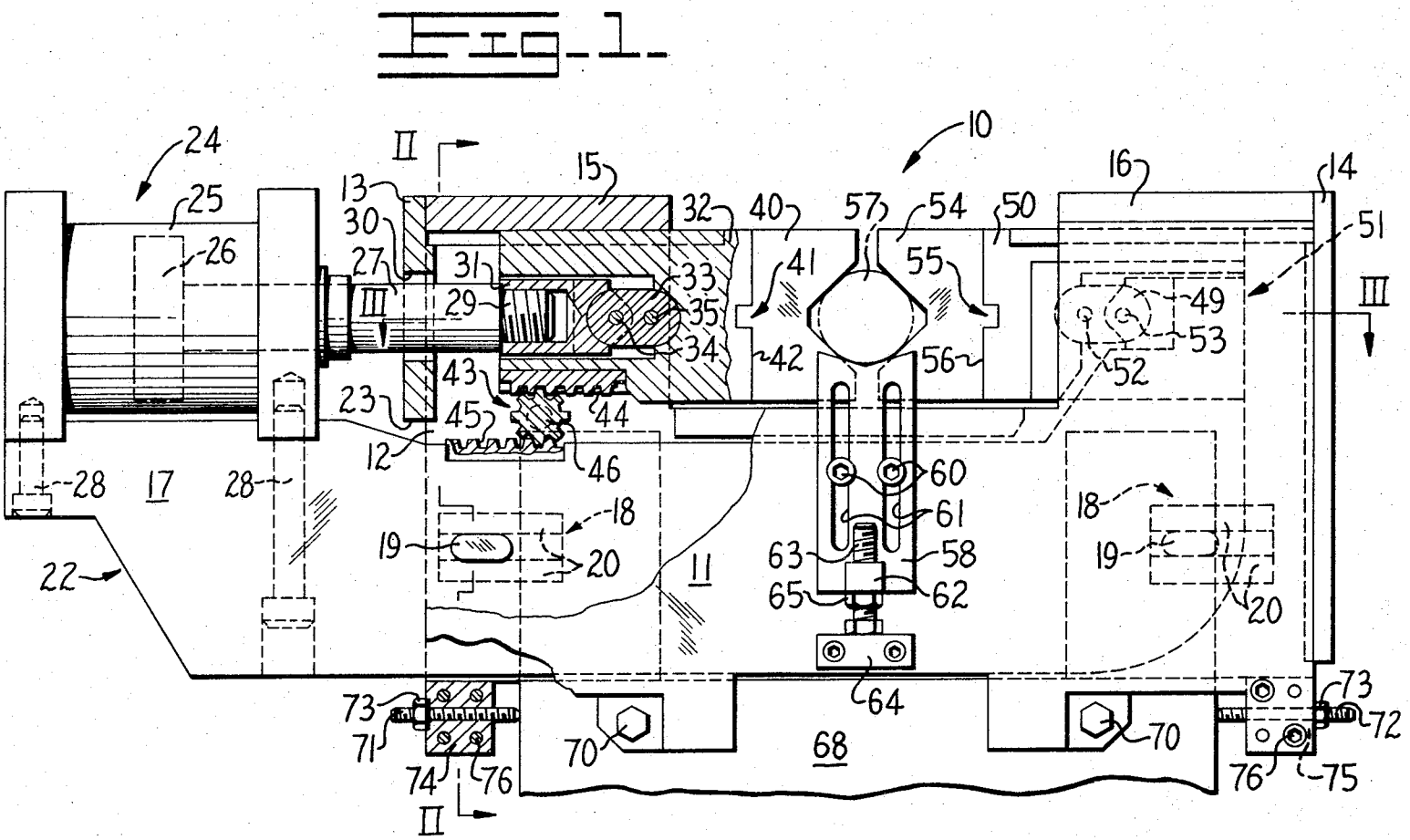
Figure 2:
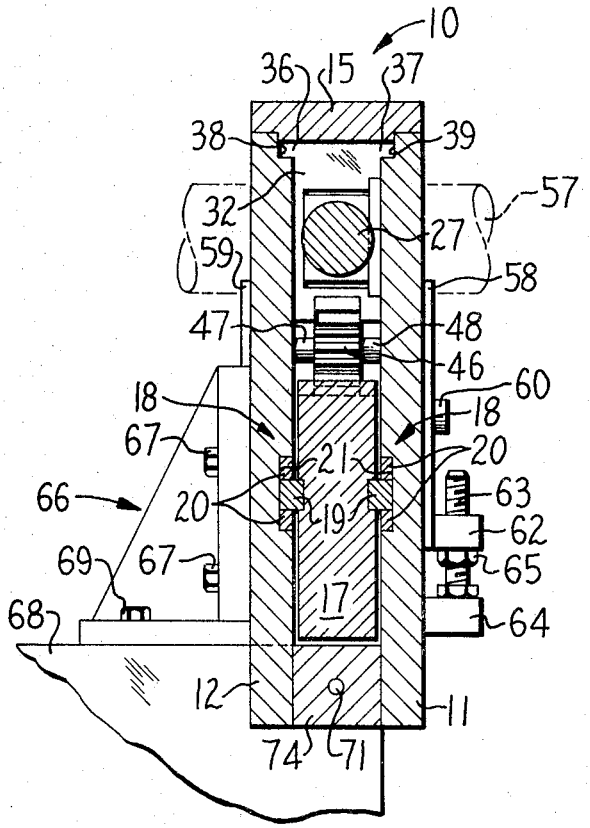
Figure 3:
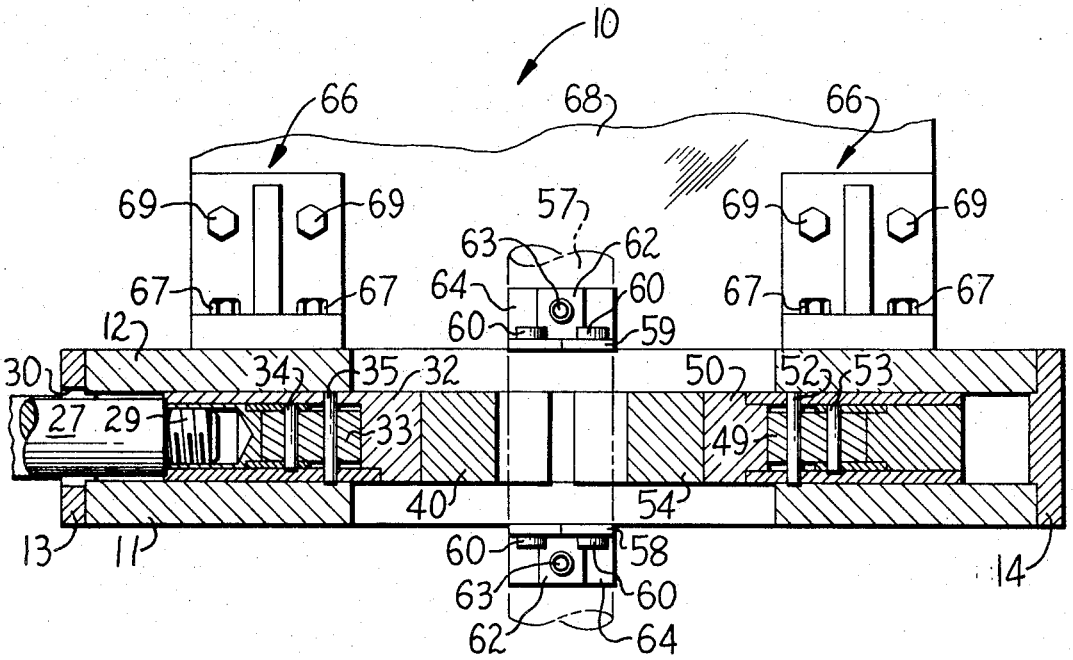

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 11, 1973

914 O.G. 398

T914,002
WORKPIECE HOLDING FIXTURE
Douglas G. K. Franks, 6516 N. University, Apt. 1301, Peoria, Ill. 61614
Filed Mar. 13, 1972, Ser. No. 234,072
**Int. Cl. B25b *1/18***
U.S. Cl. 269—20
3 Sheets Drawing. 8 Pages Specification

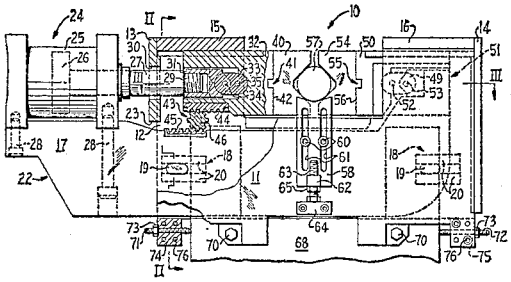

A fixture for securely holding a nonrotatable workpiece in a machine is provided having a housing and a pair of holding and clamping jaws which are movably supported for simultaneous movement toward or away from the workpiece in response to the activation of a double-acting fluid motor such as a hydraulic motor interconnecting the jaws. A timing device in the form of a pinion in simultaneous engagement with a rack on each jaw ensures synchronous movement of the jaws toward and away from each other in response, respectively, to extension and retraction of a rod of the motor by means of a piston movable within a cylinder of the motor. A pair of workpiece-supporting plates are vertically adjustably mounted by cap screws for positioning and supporting the workpiece for subsequent clamping by the jaws.

WORKPIECE HOLDING FIXTURE

Filed March 13, 1972 3 Sheets-Sheet 1

WORKPIECE HOLDING FIXTURE

Filed March 13, 1972 3 Sheets-Sheet 2

WORKPIECE HOLDING FIXTURE

Filed March 13, 1972 3 Sheets-Sheet 3